(12) United States Patent
Baba et al.

(10) Patent No.: US 11,411,473 B2
(45) Date of Patent: Aug. 9, 2022

(54) STATOR FOR ROTATING ELECTRIC MACHINE AND ROTATING ELECTRIC MACHINE

(71) Applicant: HITACHI AUTOMOTIVE SYSTEMS, LTD., Hitachinaka (JP)

(72) Inventors: Yuichiro Baba, Hitachinaka (JP); Mitsuaki Izumi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 177 days.

(21) Appl. No.: 16/760,626

(22) PCT Filed: Sep. 7, 2018

(86) PCT No.: PCT/JP2018/033128
§ 371 (c)(1),
(2) Date: Apr. 30, 2020

(87) PCT Pub. No.: WO2019/087568
PCT Pub. Date: May 9, 2019

(65) Prior Publication Data
US 2020/0259401 A1   Aug. 13, 2020

(30) Foreign Application Priority Data
Nov. 2, 2017 (JP) .............................. JP2017-212915

(51) Int. Cl.
*H02K 11/25* (2016.01)
*H02K 3/50* (2006.01)
*H02K 11/21* (2016.01)

(52) U.S. Cl.
CPC ............... *H02K 11/25* (2016.01); *H02K 3/50* (2013.01); *H02K 11/21* (2016.01)

(58) Field of Classification Search
CPC .......... H02K 11/25; H02K 3/50; H02K 11/21; H02K 11/27
(Continued)

(56) References Cited

U.S. PATENT DOCUMENTS

2016/0261175 A1* 9/2016 Takamizawa .......... H02K 11/25
2018/0017446 A1* 1/2018 Yoshihara ................. G01K 1/14
(Continued)

FOREIGN PATENT DOCUMENTS

JP   2011-223827 A      11/2011
JP   2011223827 A   *  11/2011
(Continued)

OTHER PUBLICATIONS

Goto et al, Revolving Armature, Nov. 4, 2011, JP 2011223827 (English Machine Translation) (Year: 2011).*
(Continued)

*Primary Examiner* — Quyen P Leung
*Assistant Examiner* — Alexander A Singh
(74) *Attorney, Agent, or Firm* — Foley & Lardner LLP (57) ABSTRACT

The degree of freedom in attachment of a temperature sensor is improved. A stator for a rotating electric machine includes: a temperature sensor; and a temperature sensor holder that grips a stator winding portion at a coil end (a portion of a stator winding protruding from both ends of a stator iron core) and the temperature sensor. The temperature sensor holder can be deformed in a direction other than a gripping direction in addition to the gripping direction.

17 Claims, 8 Drawing Sheets

(58) Field of Classification Search
USPC ........................................................ 310/68 C
See application file for complete search history.

(56) References Cited

U.S. PATENT DOCUMENTS

2018/0156669 A1    6/2018  Koyama
2018/0337580 A1*  11/2018  Ito et al. ................ H02K 11/25

FOREIGN PATENT DOCUMENTS

| JP | 2016-067155 A | 4/2016 | |
| WO | WO-2016/190198 A1 | 12/2016 | |
| WO | WO-2017/090363 A1 | 6/2017 | |
| WO | WO-2017090363 A1 * | 6/2017 | ............... H02K 3/04 |

OTHER PUBLICATIONS

International Search Report with English translation and Written Opinion issued in corresponding application No. PCT/JP2018/033128 dated Jan. 15, 2019.

* cited by examiner

STATOR FOR ROTATING ELECTRIC MACHINE AND ROTATING ELECTRIC MACHINE

TECHNICAL FIELD

The present invention generally relates to a stator for a rotating electric machine.

BACKGROUND ART

As a background art in this technical field, there is known a rotating electric machine having a temperature sensor holder that holds a temperature sensor (for example, see PTL 1).

PTL 1 describes that "a gripping portion 36 of a temperature sensor holding tool 30 wraps around a lower surface of a crossover conductor 22, that is, a surface facing a circumferential coil portion 18, and grips the crossover conductor 22 in cooperation with a temperature sensor 40."

CITATION LIST

Patent Literature

PTL 1: JP 2011-223827 A

SUMMARY OF INVENTION

Technical Problem

The technique disclosed in PTL 1 describes that "the gripping portion 36 has an overhang that can wrap around the lower surface of the crossover conductor 22 and grips the crossover conductor 22 using the elasticity of the overhanging. A thickness of a portion of the gripping portion 36 that wraps around the lower surface of the crossover conductor 22 can be set to be substantially the same as a dimension of a gap 24. With this setting, the temperature sensor holding tool 30 can be more stably attached and fixed to the crossover conductor 22." In addition, according to FIGS. 1 to 3 of PTL 1, the temperature sensor holding tool is made of an elastically deformable plate to grip the temperature sensor and the crossover conductor.

In general, a stator winding arranged at a coil end of a stator is complicatedly molded. For this reason, a winding portion at the coil end is not limited to a straight portion such as the crossover conductor on which the temperature sensor disclosed in PTL 1 is arranged.

There may be a need to measure the temperature of winding portions other than the straight portion instead of or in addition to the straight portion. In the technique disclosed in PTL 1, however, it is difficult to meet such a need since elastic deformation occurs only in the direction of holding the temperature sensor and the crossover conductor.

An object of the present invention is to provide a temperature sensor holder having a high degree of freedom in attachment of a temperature sensor.

Solution to Problem

A stator for a rotating electric machine includes: a temperature sensor; and a temperature sensor holder that grips a stator winding portion at a coil end (a portion of a stator winding protruding from both ends of a stator iron core) and the temperature sensor. The temperature sensor holder is deformable (for example, elastically deformable) in a direction other than a gripping direction in addition to the gripping direction.

Advantageous Effects of Invention

The temperature sensor holder of the present invention can be deformed (follow a shape of the stator winding) in the direction other than the direction of gripping the temperature sensor and the stator winding. For this reason, the degree of freedom in attachment of the temperature sensor is improved.

Other objects, configurations, and effects which have not been described above become apparent from embodiments to be described hereinafter.

DESCRIPTION OF EMBODIMENT

Hereinafter, a configuration and an operation of a stator for a rotating electric machine according to an embodiment of the present invention will be described with reference to the drawings. Note that the same portions are denoted by the same reference signs in each of the drawings.

Figure 1:
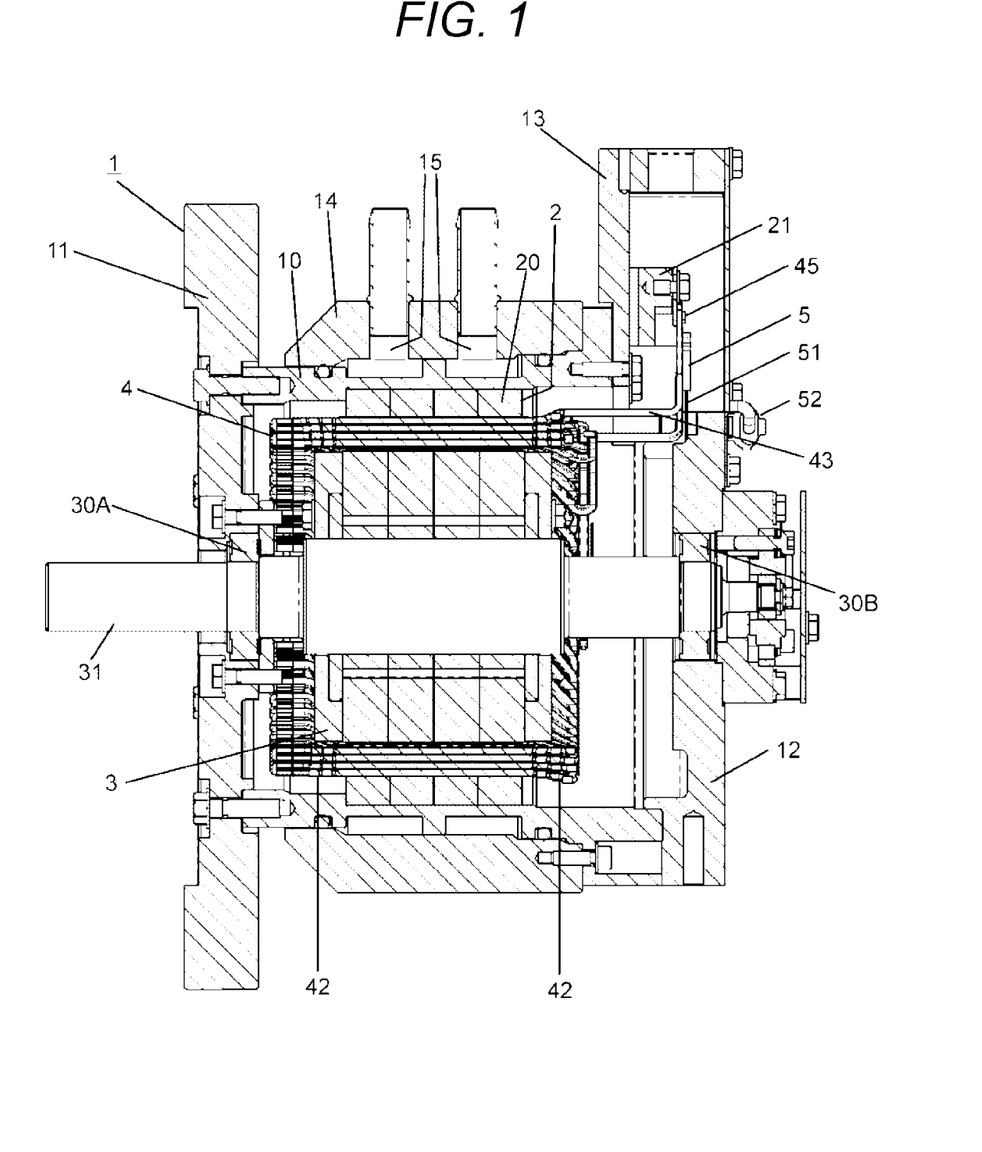
FIG. 1 is a schematic view illustrating an entire configuration of a rotating electric machine according to an embodiment of the present invention.

FIG. 1 is a schematic view illustrating an entire configuration of a rotating electric machine 1 according to the embodiment of the present invention. In FIG. 1, the interior of the rotating electric machine 1 is illustrated in a cross section of a portion of the rotating electric machine 1.

The rotating electric machine 1 includes a housing 10, a stator 2 having a stator iron core 20 fixed to the housing 10, and a rotor 3 rotatably arranged inside the stator as illustrated in FIG. 1. A casing of the rotating electric machine 1 is constituted by a front bracket 11, the housing 10, a rear bracket 12, and a terminal box 13, and the housing 10 constitutes a water passage 15 for cooling water of the rotating electric machine together with a water jacket 14.

The rotor 3 is fixed to a shaft 31 supported by a bearing 30A of the front bracket 11 and a bearing 30B of the rear bracket 12, and is rotatably held inside the stator iron core 20.

The stator iron core 20 is fixed to the housing 10 by shrink-fitting or the like, and the stator 2 is indirectly cooled by the cooling water inside the water passage 15 via the housing 10.

A stator winding 4 is arranged in a slot of the stator iron core 20 via an insulator formed like a sheet using an insulating resin material. A varnish is applied to the stator winding 4 in a manufacturing process, and the stator winding 4 is fixed to the stator iron core 20 via the insulator. A portion where the stator winding 4 straddling the slots and protruding from both ends of the stator iron core 20 is dense becomes a coil end 42. The stator winding 4 is a three-phase Y-connection winding. One end of the stator winding of each phase is arranged at the coil end 42 as a neutral point, and the other end forms an output line 43.

The output line 43 extends from the coil end 42 and is led out to be connected to the outside of the rotating electric machine 1 and transmit and receive electric energy. An output terminal 45 arranged at an end of the output line 43 is connected to a terminal block 21 inside the terminal box 13. The output line 43 is connected to an external power cable inserted into the terminal box 13 and connected to, for example, an inverter on the terminal block 21 via the output terminal 45.

The coil end 42 is cooled by heat transfer with the housing 10, the stator iron core 20, and the insulator as heat transfer paths using the cooling water flowing through the water passage 15 of the housing 10.

A temperature sensor 5 is attached to the stator winding 4 to detect a temperature of the stator winding 4. The temperature sensor 5 is, for example, a thermistor. The thermistor is a temperature sensor having a temperature detecting element made of a semiconductor whose electrical resistance value changes greatly with a change in temperature. A control unit (for example, an inverter) of the rotating electric machine detects the temperature of the stator winding by monitoring a resistance value of the thermistor. A signal line 51 of the temperature sensor 5 is connected to a connector 52.

When the detected temperature of the stator winding 4 exceeds a specified value, there is a concern about the influence on the life of an insulating coating of the stator winding 4 and the varnish applied to the stator, and thus, the control unit restricts or stops the performance of the rotating electric machine to prevent the stator winding 4 from being overheated. Therefore, it is desirable that the temperature sensor 5 be installed in close contact with the stator winding 4 in order to improve the heat transfer between the temperature sensor 5 and the stator winding 4.

Figure 2:
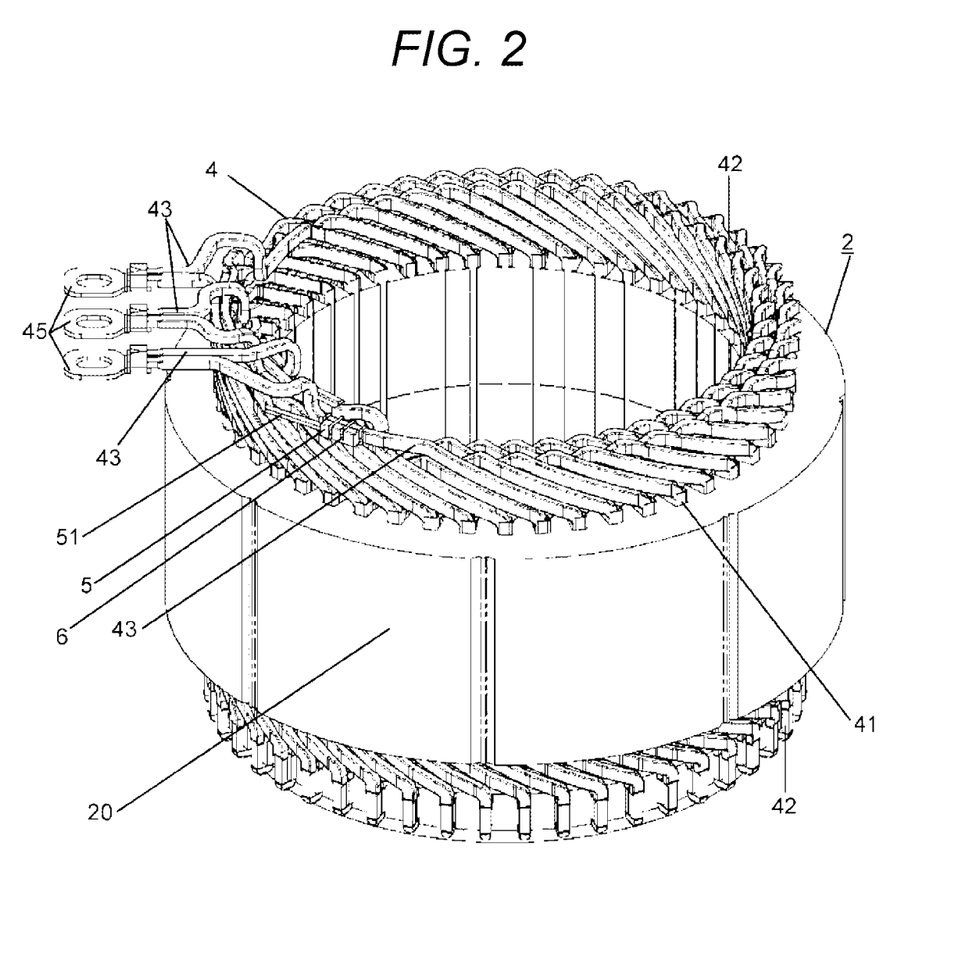
FIG. 2 is a perspective view illustrating a configuration of a stator of the rotating electric machine according to the embodiment of the present invention.

Hereinafter, details will be described with reference to FIG. 2. FIG. 2 is a perspective view illustrating a configuration of the stator 2 of the rotating electric machine according to the embodiment of the present invention.

The stator 2 includes: the stator iron core 20 having the plurality of slots formed in the circumferential direction; the stator winding 4; an insulator 41; the temperature sensor 5 that measures the temperature of the stator winding 4; and a temperature sensor holder 6 that grips the temperature sensor 5 against the stator winding 4.

The stator iron core 20 is formed in a ring shape by laminating magnetic steel plates each having a predetermined thickness in the axial direction, and has the plurality of slots along the axial direction formed in the circumferential direction on the inner circumferential side. The stator winding 4 is mainly constituted by a conductive core wire made of copper and an insulating coating covering the core wire.

The stator winding 4 is mounted in the slot of the stator iron core 20 via the insulator 41 formed like a sheet using an insulating resin material. The stator winding 4 is configured by inserting substantially U-shaped copper flat conductors into the slots of the stator iron core 20 from the axial direction, folding opening-side ends of the flat conductors, and electrically connecting folded portions of the flat conductors by welding or the like. The portion where the stator winding 4 straddling the slots and protruding from both ends of the stator iron core 20 is dense becomes the coil end 42 as described above.

The stator winding 4 is the three-phase Y-connection winding, and a U-phase stator winding, a V-phase stator winding, and a W-phase stator winding are formed by flat conductors. One end of the stator winding of each phase is arranged at the coil end 42 as a neutral point to which U-phase, V-phase, and W-phase neutral lines are connected, and the other end of the stator winding of each phase forms the output line 43.

The output line 43 extends from the coil end 42 and is led out, and the output terminal 45 of each phase is formed at an end of the output line 43.

The temperature sensor 5 is arranged at a part of the molded coil end 42 for the purpose of detecting the temperature of the stator winding 4. It is desirable that the heat conduction between the temperature sensor 5 and the stator winding 4 be good in order to accurately detect the temperature of the stator winding 4.

The temperature sensor holder 6 according to the present embodiment grips the temperature sensor 5 on the stator winding (flat conductor) 4 and the stator winding 4. As a result, the temperature sensor 5 can be relatively brought into close contact with the stator winding 4.

The coil end 42 is molded in a complicated shape. With the temperature sensor holder 6 according to the present embodiment, the temperature sensor 5 can be fixed at a desired position of the stator winding 4.

Hereinafter, details of the temperature sensor holder 6 will be described.

Figure 3:
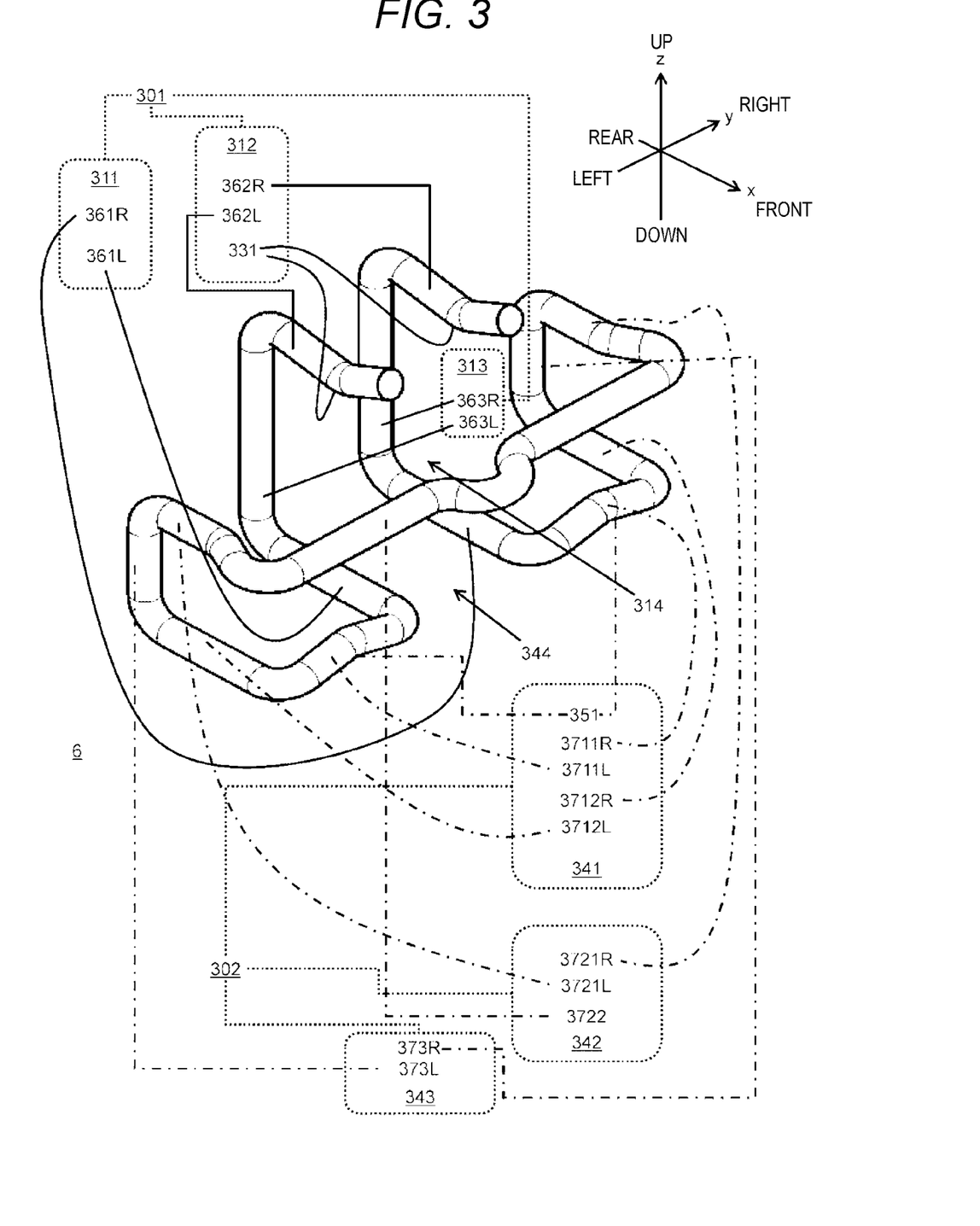
FIG. 3 is a perspective view of a temperature sensor holder according to the embodiment of the present invention.

FIG. 3 is a perspective view of the temperature sensor holder 6. Note that an xyz orthogonal coordinate system is appropriately used in the following description, as illustrated in FIG. 3. In addition, in the following description, a direction along an x-axis is referred to as a "depth direction", a +x direction is referred to as a "front direction", and a −x direction is referred to as a "rear direction" in some cases. In addition, a direction along a y-axis is referred to as a "width direction", a +y direction is referred to as a "right direction", and a −y direction is referred to as a "left direction" in some cases. In addition, a direction along a z-axis is referred to as a "height direction", a +z direction is referred to as an "up direction", and a −z direction is referred to as a "down direction" in some cases. In addition, an xy plane is referred to as a "horizontal plane" in some cases. A plane perpendicular to the xy plane (for example, an xz plane and a yz plane) is referred to as a "vertical plane" in some cases. In addition, an end on the rear direction side is referred to as a "proximal end", and an end on the front direction side is referred to as a "distal end" in some cases. In addition, a line indicating a bending portion of the temperature sensor holder 6 is illustrated on the temperature sensor holder 6 in FIG. 3 (and FIGS. 4 to 13), but such a line does not exit (but may exist) in the actual temperature sensor holder. In addition, in the following description, the "stator winding 4" is typically a stator winding portion at the coil end 42 of the stator winding 4.

The temperature sensor holder 6 is elastically deformed in the height direction (gripping direction). Specifically, the temperature sensor holder 6 has: an engaging portion 302 that engages with the stator winding 4 (flat conductor); and a gripping portion 301 that grips the stator winding 4 (flat conductor) engaging with the engaging portion 302 and the temperature sensor 5 on the stator winding 4. Both the gripping portion 301 and the engaging portion 302 are elastically deformed in the height direction (gripping direction).

The gripping portion 301 has: a first lower contact portion 311 in contact with a lower surface of the stator winding 4; a first upper contact portion 312 in contact with an upper surface of the temperature sensor 5 on the stator winding 4; and a first connecting portion 313 that connects the first lower contact portion 311 and the first upper contact portion 312. The first lower contact portion 311, the first upper contact portion 312, and the first connecting portion 313 form an opening 314 on the front side (form a substantially C-shape in a side plan view). The stator winding 4 and the temperature sensor 5 can be inserted through the opening 314. At least one of the first lower contact portion 311, the first upper contact portion 312, and the first connecting portion 313 is elastically deformed in the height direction. A minimum height of a space extending from the opening 314 to the first connecting portion 313 is shorter than a sum of a height of a side cross-section (cross-section in the xz direction) of the stator winding 4 and a height of a side cross-section of the temperature sensor 5.

The stator winding 4 and the temperature sensor inserted from the opening 314 and proceeding in the rear direction relatively push the first upper contact portion 312 in the up direction and further proceed in the rear direction. In this state, an elastic force along the height direction acts on the gripping portion 301 toward the center, and the temperature sensor 5 on the stator winding 4 and the stator winding 4 are gripped by the first lower contact portion 311 and the first upper contact portion 312 (see FIG. 5). Note that the first connecting portion 313 extends along the height direction and connects the first lower contact portion 311 and the first upper contact portion 312 so that it is possible to prevent the temperature sensor 5 from further moving in the rear direction than a certain position on the stator winding 4.

The temperature sensor holder 6 according to the present embodiment, specifically, both the gripping portion 301 and the engaging portion 302 are elastically deformed in a direction other than the height direction in addition to the elastic deformation in the height direction (gripping direction). For example, at least one of the first lower contact portion 311, the first upper contact portion 312, and the first connecting portion 313 can be elastically deformed in a direction other than the height direction. In addition, for example, at least one of a second lower contact portion 341, a second upper contact portion 342, and a second connecting portion 343, which will be described later, can be elastically deformed in a direction other than the height direction. As a result, the temperature sensor 5 can be fixed to a desired position of the stator winding 4 desired winding portion in the coil end 42). That is, the degree of freedom in attachment of the temperature sensor 5 is high. A specific example of attachment of the temperature sensor 5 will be described later.

A portion 331 where the first upper contact portion 312 comes into contact with the upper surface of the temperature sensor 5 has a curved surface. As a result, it is possible to prevent the upper surface of the temperature sensor 5 from being damaged when the temperature sensor 5 is attached or detached. In addition, it is easy to attach and detach the temperature sensor 5.

The engaging portion 302 has: the second lower contact portion 341 in contact with the lower surface of the stator winding 4; the second upper contact portion 342 in contact with an upper surface of the stator winding 4; and the second connecting portion 343 that connects the second lower contact portion 341 and the second upper contact portion 342.

The second lower contact portion 341, the second upper contact portion 342, and the second connecting portion 343 form an opening 344 on the front side (form a substantially C-shape in a side plane view). The stator winding 4 can be inserted from the opening 344. The stator winding 4 inserted from the opening 344 and progressing in the rear direction relatively pushes the second upper contact portion 342 in the up direction and further progresses in the rear direction. In this state, when a minimum height of a space extending from the opening 344 to the second connecting portion 343 is shorter than a height of the side cross-section (cross-section in the xz direction) of the stator winding 4, an elastic force along the height direction acts on the engaging portion 302 toward the center, and the stator winding 4 is gripped by the second lower contact portion 341 and the second upper contact portion 342 (see FIG. 4). In addition, even when the minimum height of the space extending from the opening 344 to the second connecting portion 343 is equal to or longer than the height of the side cross-section (cross-section in the xz direction) of the stator winding 4, the stator winding 4 is gripped to be enclosed by the second lower contact portion 341, the second upper contact portion 342, the second connecting portion 343, and a disengagement preventing portion 351 to be described later. Note that the opening 344 overlaps a lower portion of the opening 314.

In this manner, the engaging portion 302 grips the stator winding 4. As a result, it is not necessary to mount the stator winding 4 and the temperature sensor 5 together on the temperature sensor holder 6. In other words, it is possible to first mount the temperature sensor holder 6 on the stator winding 4 (see FIG. 4), and then, attach the temperature sensor 5 to the temperature sensor holder 6 (to be arranged on the stator winding 4) (see FIG. 5).

Note that a position of the second connecting portion 343 along the depth direction may be the same as a position of the first connecting portion 313, may be on the rear direction side, or may be on the front direction side.

In addition, the second lower contact portion 341 has the disengagement preventing portion 351 that engages with a side surface (side surface on the front direction side) of the stator winding 4 progressing up to a certain position in the rear direction (the first connecting portion 313 or the second connecting portion 343 in the present embodiment) so as to prevent the disengagement from the stator winding 4. As a result, it is possible to prevent the stator winding 4 from relatively moving from the opening 344 in the front direction, that is, prevent the temperature sensor holder 6 from being disengaged from the stator winding 4 before the temperature sensor 5 is arranged on the stator winding 4 after attaching the temperature sensor holder 6 to the stator winding 4. Note that the engaging portion 302 grips the stator winding 4 by the elastic force in the present embodiment, but may simply engage with the stator winding 4 without gripping the stator winding 4 by the elastic force. This is because it is more convenient to attach the temperature sensor 5 if a positional relationship between the stator windings 4 and the temperature sensor holder 6 is moved with a certain degree of freedom. Even if the engaging portion 302 simply engages with the stator winding 4, the disengagement preventing portion 351 engages with the side surface of the stator winding 4 (side surface on the front direction side) so that the engaging portion 302 encloses the stator winding 4. Thus, it is possible to prevent the temperature sensor holder 6 from being disengaged from the stator winding 4. In other words, the engaging portion 302 serves as a temporary holding portion until the temperature sensor 5 enters the temperature sensor holder 6.

In addition, the engaging portion 302 also serves to position the temperature sensor 5 with respect to the stator winding 4. Specifically, the second upper contact portion 342 of the engaging portion 302 performs at least one of positioning in the width direction on the winding 4 (positioning to restrict the movement of the temperature sensor 5 along the width direction) and positioning in the depth direction on the winding 4 (positioning to restrict the movement of the temperature sensor 5 along the front direction). Note that the first connecting portion 313 prevents the temperature sensor 5 on the stator winding 4 from moving in the rear direction from a certain position. In addition, the movement of the temperature sensor 5 on the stator winding 4 in the height direction naturally prevented by the gripping portion 301.

In the temperature sensor holder 6, the gripping portion 301 and the engaging portion 302 are integrally molded. Specifically, for example, the gripping portion 301 and the engaging portion 302 are molded using one identical wire. In the gripping portion 301, the first lower contact portion 311 corresponds two first lower arms 361L and 361R extending in the depth direction and arranged side by side. The first upper contact portion corresponds to two first upper arms 362L and 362R extending in the depth direction and arranged side by side. The first connecting portion 313 corresponds to two first connecting arms 363L and 363R which connect proximal ends of the two first lower arms 361L and 361R and proximal ends of the two first upper arms 362L and 362R, respectively, and are arranged side by side. In the engaging portion 302, the second lower contact portion 341 is constituted by two widthwise lower arms 3711L and 3711R extending in the width direction (laterally outward) from distal ends of the two first lower arms 361L and 362R and two depthwise lower arms 3712L and 3712R extending in the rear direction respectively from distal ends of the two widthwise lower arms 3711L and 3711R. The second upper contact portion 342 is constituted by two depthwise upper arms 3721L and 3721R extending in the rear direction and facing each other laterally, and a widthwise upper arm 3722 which connects distal ends of two depthwise upper arms 3721L and 3721R and extends in the width direction. The second connecting portion 343 is constituted by two second connecting arms 373L and 373R which connect proximal ends of the two depthwise lower arms 3712L and 3712R and proximal ends of the two depthwise upper arms 3721L and 3721R, respectively, and face each other laterally. In this manner, the temperature sensor holder 6 is molded using one wire.

Note that the portion 331, which comes into contact with the upper surface of the temperature sensor 5, of the first upper contact portion 312 is an elbow of each of the two first upper arms 362L and 362R. That is, each of the two first upper arms 362L and 362R has a V-shape in a side plan view. As a result, the temperature sensor 5 inserted from the opening 314 easily progresses on the winding 4 in the rear direction.

In addition, in each of the second lower contact portions 341 of the engaging portion 302, the disengagement preventing portion 351 is a mountain portion in each of the two widthwise lower arms 3711L and 3711R. That is, each of the two widthwise lower arms 3711L and 3711R has a mountain shape (an inverted V-shape) in a front plan view.

In addition, a section modulus of an arm elastically deformed in a direction other than the direction of gripping the stator winding 4 is equivalent to a section modulus of an arm deformed in the direction of gripping the stator winding 4 in the present embodiment. For example, the temperature sensor holder 6 formed using the wire (for example, a cross-sectional shape thereof is a circle, and all the cross-sectional shapes are the same), and thus, a section modulus is the same regardless of the direction in terms of the bend. For this reason, the temperature sensor 5 can be easily fixed by being deformed along the molded stator winding 4. Therefore, the workability of attaching the temperature sensor 5 is excellent and the versatility to be applied to various stator windings 4 with one configuration is excellent.

In addition, the wire is made of the same material as the stator winding 4 in the present embodiment.

For this reason, it is possible to avoid a risk of corrosion caused by contact between dissimilar metals.

In addition, the wire has an insulating coating in the present embodiment. Even in this case, it is possible to avoid the risk of corrosion caused by contact between dissimilar metals. In general, an enamel-coated copper wire of the same material as the stator winding 4 is considered to be excellent in availability, inexpensive, and suitable for the material of the temperature sensor holder 6. In addition, it is possible to prevent the temperature sensor holder 6 from being charged when the wire has the insulating coating (is coated with an insulating member). It is considered that there is a need to electrically strengthen the insulation of the temperature sensor 5 if the temperature sensor holder is likely to be charged, but it is unnecessary to strengthen the insulation of the temperature sensor 5 since the temperature sensor holder 6 according to the present embodiment is not charged.

In addition, this temperature sensor holder 6 is configured such that the stator winding 4 and the temperature sensor 5 are inserted and fixed thereto, and thus, the temperature sensor 5 can be fixed to the stator winding 4 after molding the coil end 42. Therefore, there is no risk of damaging the temperature sensor 5 during molding of the coil end 42. In addition, the temperature sensor 5 can be attached even after applying the varnish to the stator winding 4, and thus, it is unnecessary to perform any additional work such as masking the signal line 51 of the temperature sensor 5 during the varnish treatment, and the workability of assembly is excellent.

Hereinafter, some specific examples of the attachment of the temperature sensor 5 will be described.

FIRST SPECIFIC EXAMPLE

Attachment to Straight Portion of Stator Winding 4

Figure 4:
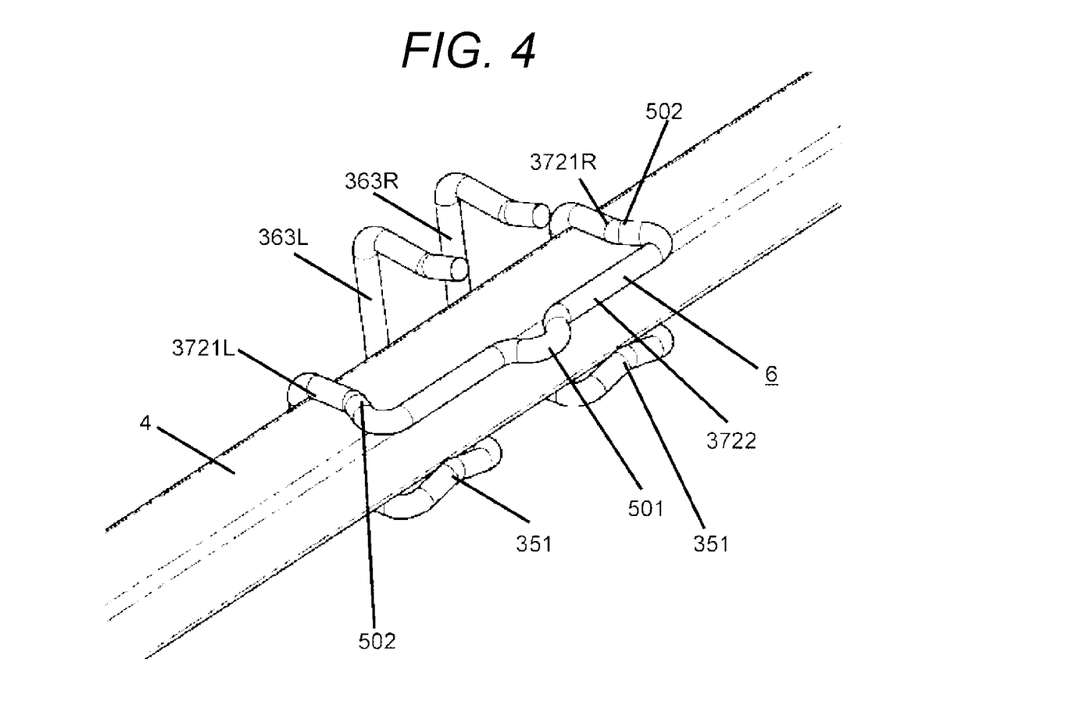
FIG. 4 is a perspective view of the temperature sensor holder of FIG. 3 mounted on a stator winding.

First, work of attaching the temperature sensor holder 6 to the stator winding 4 is performed as illustrated in FIG. 4. That is, the stator winding 4 is inserted from the opening 344 of the temperature sensor holder 6, and the stator winding 4 is pushed in the rear direction. Then, the disengagement preventing portion 351 engages with the side surface side surface on the front direction side) of the winding 4, and the engaging portion 302 (for example, the second connecting arms 373L and 373R) is deformed to be bent (warped), thereby gripping the stator winding 4. Since the disengagement preventing portion 351 is provided (specifically, since a part of each widthwise lower arm draws the mountain shape), the temperature sensor holder 6 can be prevented from being disengaged from the stator winding 4 after mounting the temperature sensor holder 6 to the stator winding 4. Note that the opening 344 of the temperature sensor holder 6 expands in the height direction at the time of mounting the temperature sensor holder 6 to the stator winding 4. At this time, the opening 344 can be expanded in the height direction with not only bending (warping) deformation of the second connecting arms 373L and 373R but also torsional deformation of a part of each of the second connecting arms 373L and 373R.

Note that the widthwise upper arm 3722 has a bend 501 in a part (for example, the center) thereof. A length of the second upper contact portion 342 in the width direction can be extended by stretching the bend 501 (see a broken-line frame 601 in FIG. 5). In addition, each of the depthwise upper arms 3721L and 3721R partially has a bend 502.

Figure 5:
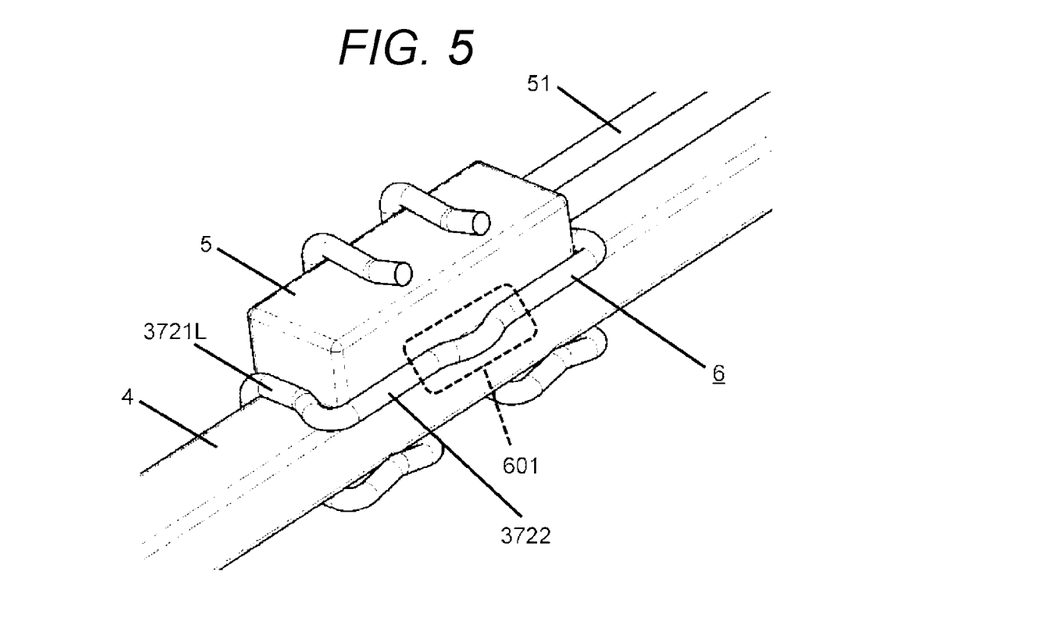
FIG. 5 is a perspective view of the temperature sensor holder of FIG. 3 that grips the stator winding and the temperature sensor.

A length of the second upper contact portion 342 in the depth direction can be extended by stretching the bend 502. In this manner, the length of the second upper contact portion 342 can be increased both in the depth direction and in the width direction. For this reason, the tolerance of the temperature sensor 5 (variation in length along the depth direction or the width direction) can be absorbed.

After mounting the temperature sensor holder 6 to the stator winding 4, the temperature sensor 5 can be attached to the stator winding 4 as illustrated in FIG. 5. That is, the temperature sensor 5 is inserted from the opening 314 and is pushed in the rear direction. Then, the temperature sensor 5 is arranged on the stator winding 4, and the gripping portion 301 grips the temperature sensor 5 and the stator winding 4. The temperature sensor 5 is gripped in close contact with the stator winding 4 by the elasticity of the gripping portion 301. For this reason, a state where the heat conduction between the stator winding 4 and the temperature sensor 5 is good is ensured. In addition, the temperature sensor 5 on the stator winding 4 is positioned by the engaging portion 302 (second upper contact portion 342). Specifically, the movement of the temperature sensor 5 along the width direction is restricted by the two depthwise upper arms 3721L and 3721R facing each other laterally, and the movement of the temperature sensor 5 along the depth direction is restricted by the widthwise upper arm 3722 (and the first connecting arms 363L and 363R).

Note that each of the first upper arms 362L and 362R has the V-shape in the side plan view as described above in the present embodiment as illustrated in FIG. 3. In other words, the first upper arms 362L and 362R extend downward obliquely with respect to the front direction from upper ends of the first connecting arms 363L and 363R, respectively, are bent obliquely upward with respect to the front direction at certain positions, and extend obliquely upward as it is. The tolerance of the temperature sensor 5 (for example, variation in height or depth of the temperature sensor 5) and the tolerance of the stator winding 4 (for example, variation in cross-sectional area of the stator winding 4) can be absorbed by adjusting an angle between each of the two first connecting arms 363L and 363R and each of the two first upper arms 362L and 362R or a distance from each of the proximal ends of the two first upper arms 362L and 362R to the contact portion (bending position (elbow)) 331. At least one of each of the first upper arms 362L and 362R, each of the first lower arms 361L and 361R, each of the first connecting arms 363L and 363R, each of the second connecting arms 373L and 373R, each of the depthwise lower arms 3712L and 3712R, and each of the widthwise lower arms 3711L and 3711R partially has the stretchable bend.

SECOND SPECIFIC EXAMPLE

Attachment to Bending Portion Along Horizontal Plane of Stator Winding 4

Both the gripping portion 301 and the engaging portion 302 can be bent (warped) along a bending shape of the stator winding 4. Specifically, the temperature sensor holder 6 can be bent along the horizontal direction (see an arrow 602 in FIG. 6) to widen a distance between the two connecting arms such that the stator windings 4 progresses in the rear direction until the disengagement preventing portions 351 engaged with the side surface of the stator winding 4.

Figure 7:
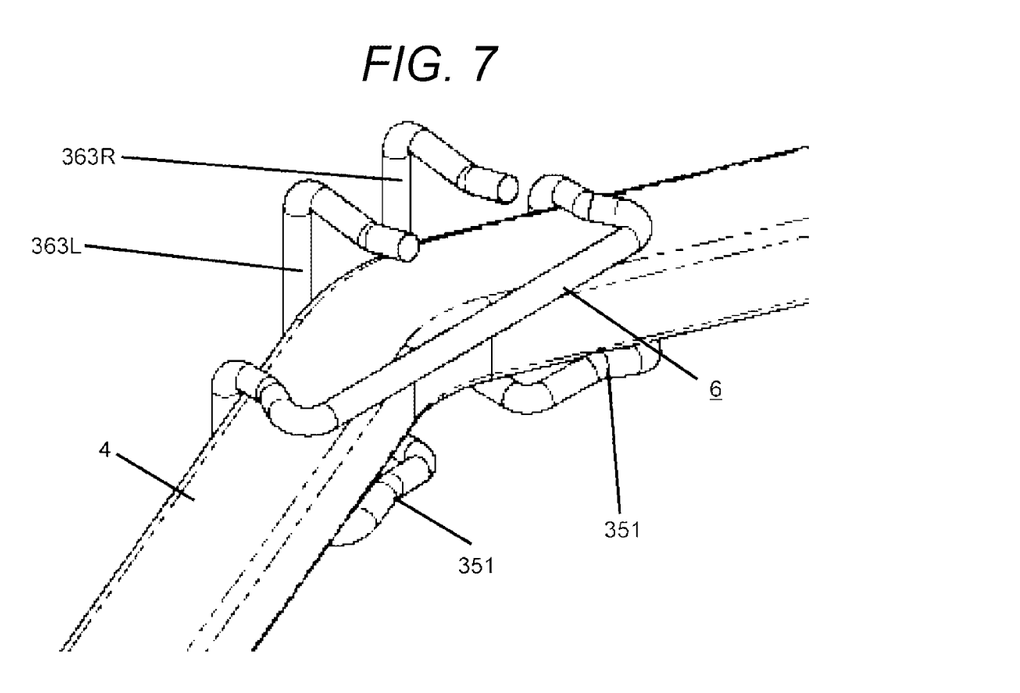
FIG. 7 is a perspective view of the temperature sensor holder of FIG. 6 mounted on the stator winding bent in the horizontal direction.
Figure 8:
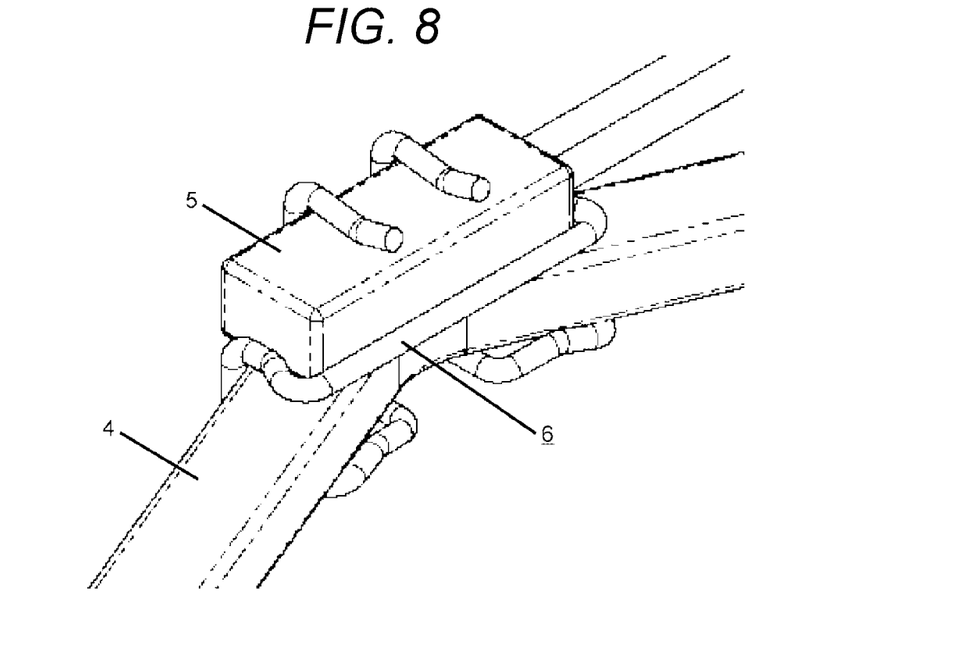
FIG. 8 is a perspective view of the temperature sensor holder of FIG. 6 that grips the stator winding bent in the horizontal direction and the temperature sensor.

A work procedure in the second specific example is the same as a work procedure in the first specific example. That is, first, work of attaching the temperature sensor holder 6 to the stator winding 4 is performed as illustrated in FIG. 7. Since there is a space between the first connecting arms 363L and 363R, a part of the bending portion of the stator winding 4 can enter between the first connecting arms 363L and 363R. Further, the temperature sensor holder 6 can be bent along the horizontal direction so as to widen the distance between the second connecting arms 373L and 373R such that the stator winding 4 progresses in the rear direction until the disengagement preventing portion 351 engages with the side surface of the stator winding 4. After mounting the temperature sensor holder 6 to the stator winding 4, the temperature sensor 5 can be attached onto the bending portion of the stator winding 4 as illustrated in FIG. 8.

Figure 6:
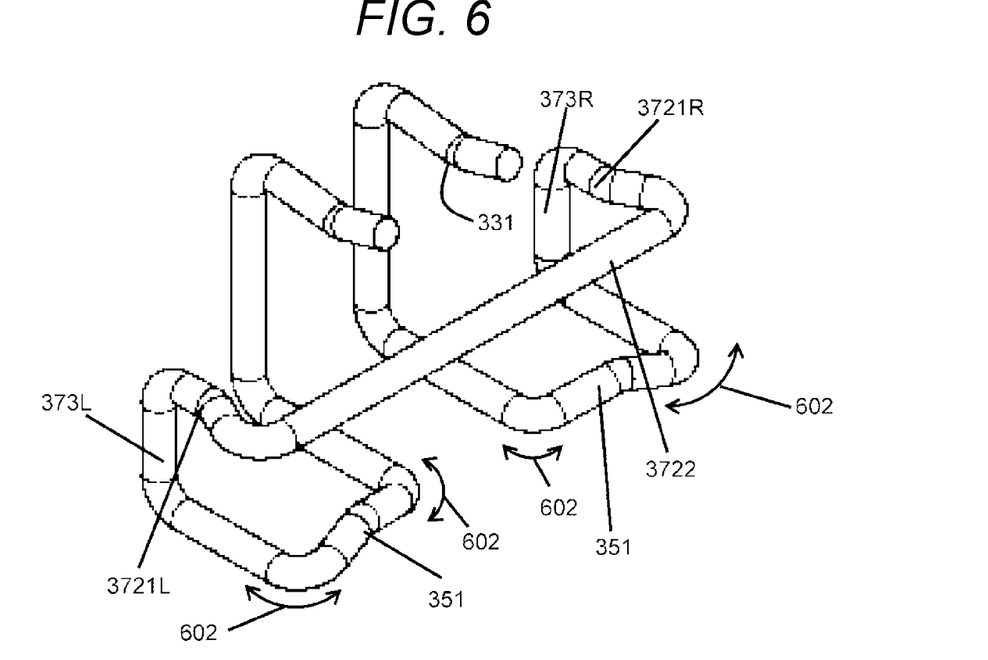
FIG. 6 is a perspective view of the temperature sensor holder that can be mounted to the stator winding bent in the horizontal direction by stretching a bend in a widthwise upper arm in the width direction.

Note that the temperature sensor holder 6 according to the second specific example is a temperature sensor holder of a type that does not have the bend 501 in a part of the widthwise upper arm 3722. That is, the length of the second upper contact portion 342 in the width direction can be extended by stretching the bend 501 if the bend 501 exists, but the bend 501 is not necessarily provided. This is the same for a third specific example to be described later.

THIRD SPECIFIC EXAMPLE

Attachment to Bending Portion Along Vertical Surface of Stator Winding 4

Figure 9:
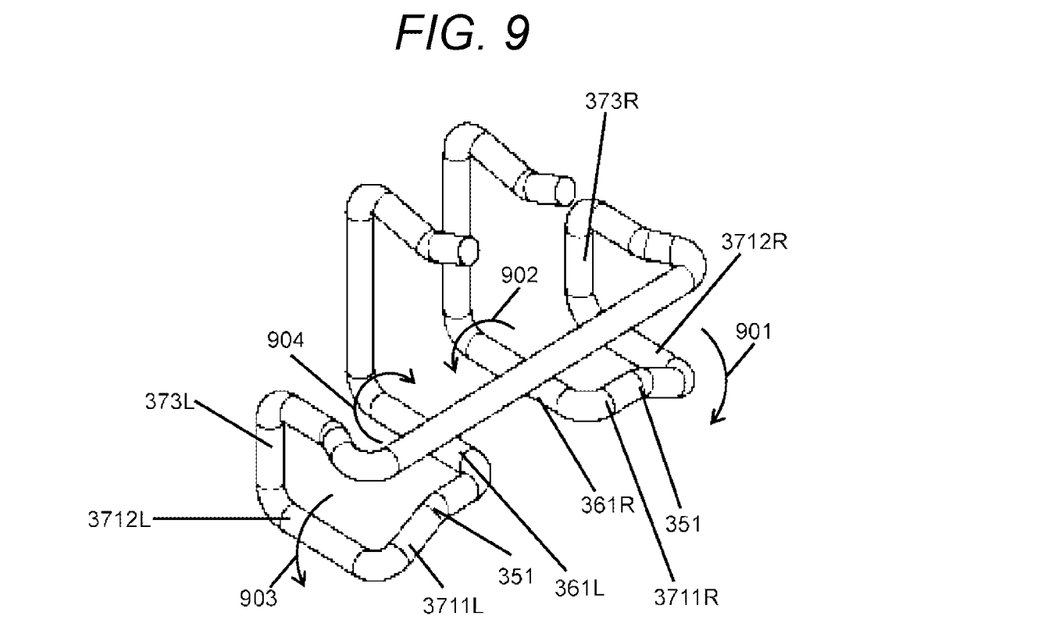
FIG. 9 is a perspective view of the temperature sensor holder that can be mounted on the stator winding bent in the vertical direction.

Both the gripping portion 301 and the engaging portion 302 can be bent (warped) along a bending shape of the stator winding 4. Specifically, as illustrated in FIG. 9, the depthwise lower arm 3712R on the right can be twisted in the clockwise direction with a lower end of the second connecting arm 373R on the right as an axis (see an arrow 901 in FIG. 9), the first lower arm 361R on the right can be twisted in the counterclockwise direction with a left end of the widthwise lower arm 3711R on the right as an axis (see an arrow 902 in FIG. 9), the depthwise lower arm 3712L on the left can be twisted in the counterclockwise direction with the lower end of the second connecting arm 373L on the left as an axis (see an arrow 903 in FIG. 9), and the first lower arm 361L on the left can be twisted in the clockwise direction with a right end of the widthwise lower arm 3711L on the left as an axis (see an arrow 904 in FIG. 9) such that the disengagement preventing portion 351 engages with the side surface of the stator winding 4.

Figure 10:
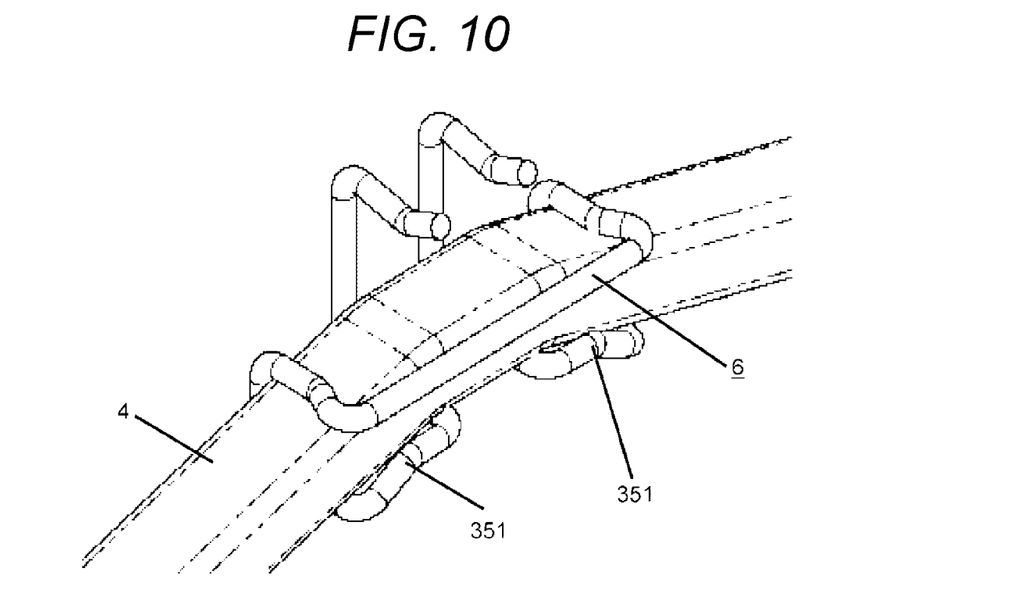
FIG. 10 is a perspective view of the temperature sensor holder of FIG. 9 mounted on the stator winding bent in the vertical direction.
Figure 11:
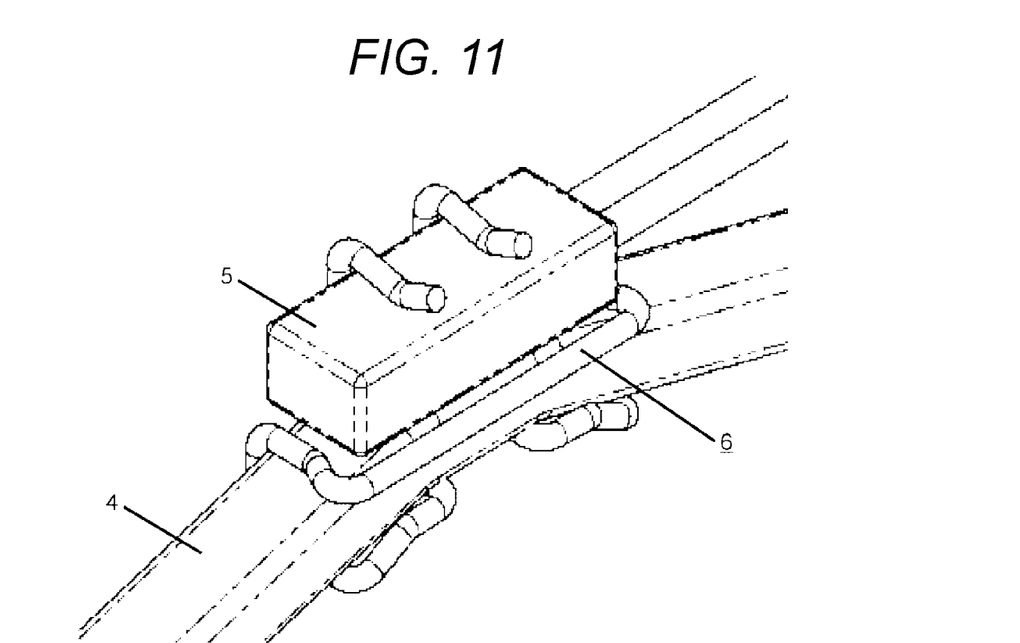
FIG. 11 is a perspective view of the temperature sensor holder of FIG. 9 that grips the stator winding bent in the vertical direction and the temperature sensor.

A work procedure in the third specific example is also the same as the work procedure in the first and second specific examples. That is, first, work of attaching the temperature sensor holder 6 to the stator winding 4 is performed as illustrated in FIG. 10. At this time, the depthwise lower arms 3712L and 3712R and the first lower arms 361R and 361L are twisted as described above so as to follow the bending shape of the stator winding 4. The disengagement preventing portion 351 engages with the side surface of the stator winding 4. After mounting the temperature sensor holder 6 to the stator winding 4, the temperature sensor 5 can be attached onto the bending portion of the stator winding 4 as illustrated in FIG. 11.

Figure 12:
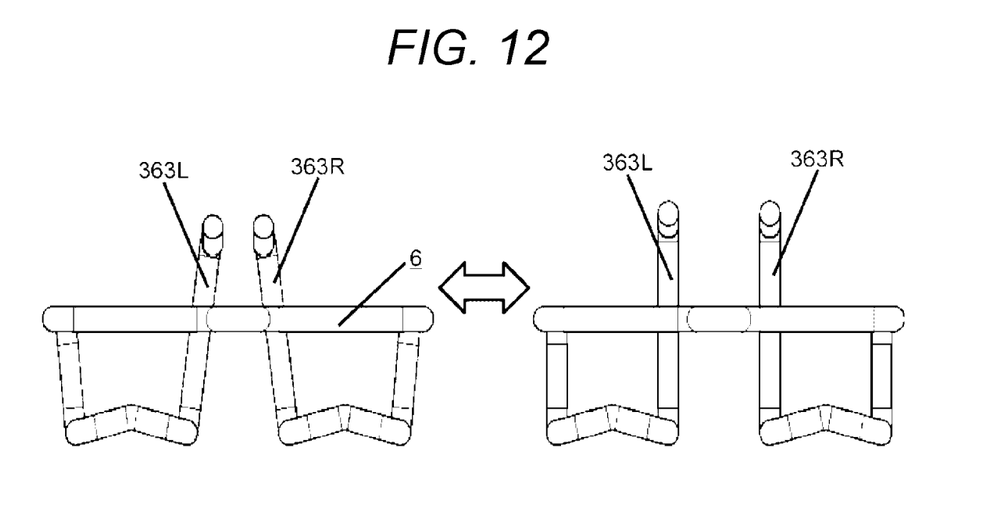
FIG. 12 is a schematic view of adjustment of a height of the temperature sensor holder.

As illustrated on the left side of the paper of FIG. 12, the temperature sensor holder 6 is configured such that the first connecting arms 363L and 363R have an angle (are inclined along the width direction) with respect to the direction of gripping the stator winding 4 and the temperature sensor 5 (that is, the height direction). The inclination of the first connecting arms 363L and 363R with respect to the height direction can be changed along the width direction. For example, as illustrated on the right side of the paper, each of the first connecting arms 363L and 363R becomes parallel to the height direction by torsional deformation, so that it is possible to increase an allowable width for the stator winding 4 and the temperature sensor 5 when gripping the stator winding 4 and the temperature sensor 5 by the temperature sensor holder 6. Therefore, the temperature sensor holder 6 can be shared for the stator windings 4 having different cross-sectional areas (for example, heights), the allowable tolerance width of the stator winding 4 and the temperature sensor 5 can be increased, and the manufacturing cost can be reduced. That is, the versatility of the temperature sensor holder 6 is high.

Although the embodiment has been described above, the present invention is not limited to this embodiment. Other aspects conceivable within a technical idea of the present invention are also included within the scope of the present invention.

Figure 13:
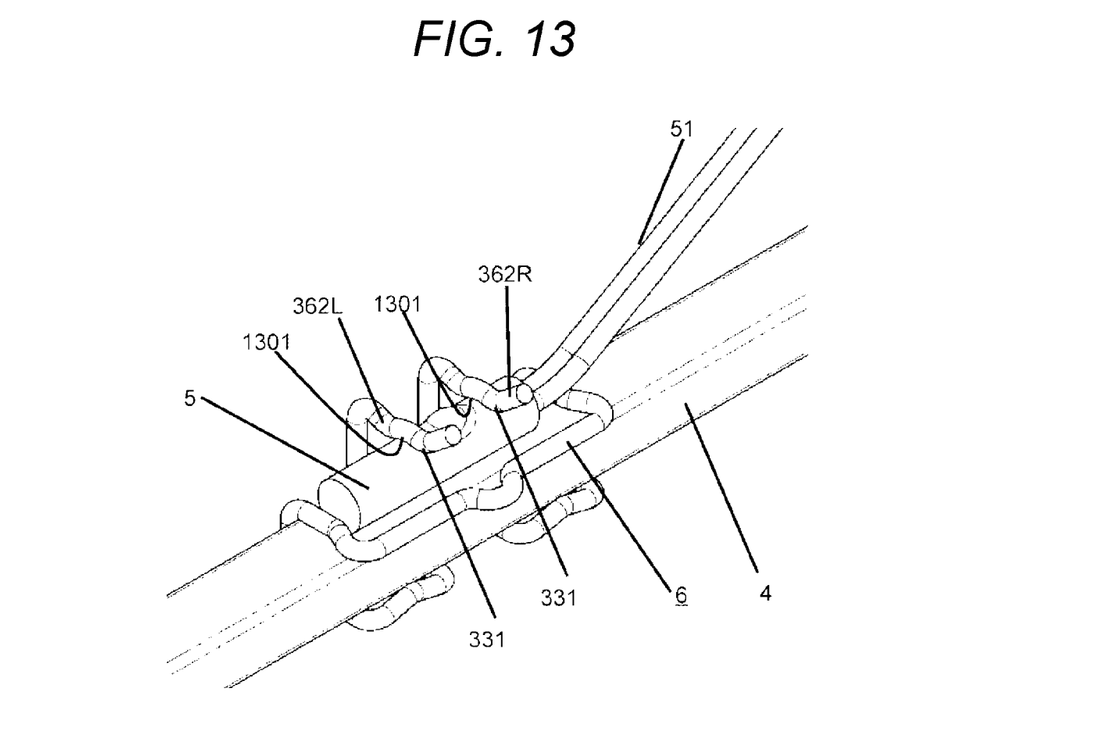
FIG. 13 is a perspective view of a temperature sensor holder according to a modification.

For example, a cross-sectional shape of the temperature sensor 5 may be a shape other than a square, for example, a circle. As illustrated in FIG. 13, when the temperature sensor 5 having a cylindrical shape, such as a tubular temperature sensor, is employed (or even in other cases), each of the two first upper arms 362L and 362R may have not only the elbow 331 that facilitates progressing of the temperature sensor 5 in the rear direction but also a portion 1301, bent along a shape of the contact portion on the upper surface of the temperature sensor 5 (a shape of the upper side of the cross-sectional shape of the temperature sensor 5), on a side in the rear direction from the elbow 331. As a result, a force for pressing the temperature sensor 5 relatively to the stator winding 4 can be maintained regardless of the cross-sectional shape (the shape of the upper surface) of the temperature sensor 5.

In addition, for example, "two" in each expression of the "two arms" may mean "at least two". For example, at least one of the first lower arm and the first upper arm may be provided as three or more arms arranged along the width direction in the gripping portion 301.

REFERENCE SIGNS LIST 1 rotating electrical machine
2 stator
20 stator iron core
4 stator winding
5 temperature sensor
6 temperature sensor holder

The invention claimed is:

1. A stator for a rotating electric machine comprising:
a stator iron core;
a stator winding mounted on the stator iron core;
a temperature sensor; and
a temperature sensor holder that grips a stator winding portion at a coil end, which is a portion of the stator winding protruding from both ends of the stator iron core, and the temperature sensor,
the temperature sensor holder includes:
an engaging portion that engages with the stator winding portion; and
a gripping portion that grips the stator winding portion engaging with the engaging portion and the temperature sensor on the stator winding portion by elastic deformation, wherein
the gripping portion includes:
a first lower contact portion in contact with a lower surface of the stator winding portion;
a first upper contact portion in contact with an upper surface of the temperature sensor on the stator winding portion; and
a first connecting portion that connects the first lower contact portion and the first upper contact portion,
at least one of the first lower contact portion, the first upper contact portion, or the first connecting portion is deformable in a gripping direction, which is the direction along which the gripping portion grips the stator winding portion and the temperature sensor, and
at least one of the first lower contact portion, the first upper contact portion or the first connecting portion is deformable in a direction other than the gripping direction.

2. The stator for a rotating electric machine according to claim 1, wherein
the engaging portion and the gripping portion are formed using one identical wire.

3. The stator for a rotating electric machine according to claim 1, wherein
each of the engaging portion and the gripping portion is made of an identical material with the stator winding.

4. The stator for a rotating electric machine according to claim 1, wherein
each of the engaging portion and the gripping portion of the temperature sensor holder is coated with an insulating member.

5. The stator for a rotating electric machine according to claim 1, further comprising a disengagement preventing portion that prevents the temperature sensor holder from being disengaged from the stator winding portion engaging with the engaging portion.

6. A rotating electric machine comprising the stator according to claim 1.

7. A stator for a rotating electric machine comprising:
a stator iron core;
a stator winding mounted on the stator iron core;
a temperature sensor; and
a temperature sensor holder that grips a stator winding portion at a coil end, which is a portion of the stator winding protruding from both ends of the stator iron core, and the temperature sensor,
wherein
the temperature sensor holder includes:
an engaging portion that engages with the stator winding portion; and
a gripping portion that grips the stator winding portion engaging with the engaging portion and the temperature sensor on the stator winding portion by elastic deformation,
wherein the engaging portion includes:
a second lower contact portion in contact with the lower surface of the stator winding portion;
a second upper contact portion in contact with an upper surface of the stator winding portion; and
a second connecting portion that connects the second lower contact portion and the second upper contact portion,
at least one of the second lower contact portion, the second upper contact portion or the second connecting portion is deformable in a gripping direction which is the direction along which the gripping portion grips the stator winding portion and the temperature sensor, and
at least one of the second lower contact portion, the second upper contact portion, or the second connecting portion is deformable in a direction other than the gripping direction.

8. The stator for a rotating electric machine according to claim 7, wherein
the second upper contact portion positions the temperature sensor on the stator winding portion.

9. The stator for a rotating electric machine according to claim 7, wherein
the second lower contact portion has a disengagement preventing portion that engages with a side surface of the stator winding portion to prevent disengagement from the stator winding portion.

10. A stator for a rotating electric machine comprising:
a stator iron core;
a stator winding mounted on the stator iron core;
a temperature sensor; and
a temperature sensor holder that grips a stator winding portion at a coil end, which is a portion of the stator winding protruding from both ends of the stator iron core, and the temperature sensor,
wherein the temperature sensor holder includes:
an engaging portion that engages with the stator winding portion; and
a gripping portion that grips the stator winding portion engaging with the engaging portion and the temperature sensor on the stator winding portion by elastic deformation,
wherein
the gripping portion includes:
a first lower contact portion in contact with a lower surface of the stator winding portion;
a first upper contact portion in contact with an upper surface of the temperature sensor on the stator winding portion; and
a first connecting portion that connects the first lower contact portion and the first upper contact portion,
at least one of the first lower contact portion, the first upper contact portion, or the first connecting portion is deformable in a gripping direction, which is the direction along which the gripping portion grips the stator winding portion and the temperature sensor,
at least one of the first lower contact portion, the first upper contact portion or the first connecting portion is deformable in a direction other than the gripping direction,
the engaging portion includes:
a second lower contact portion in contact with the lower surface of the stator winding portion;
a second upper contact portion in contact with an upper surface of the stator winding portion; and
a second connecting portion that connects the second lower contact portion and the second upper contact portion,
at least one of the second lower contact portion, the second upper contact portion or the second connecting portion is deformable in the gripping direction, and
at least one of the second lower contact portion, the second upper contact portion, or the second connecting portion is deformable in a direction other than the gripping direction.

11. The stator for a rotating electric machine according to claim 10, wherein
the engaging portion and the gripping portion are formed using one identical wire,
in the gripping portion,
the first lower contact portion corresponds to two first lower arms extending in a depth direction and arranged side by side,
the first upper contact portion corresponds to two first upper arms extending in the depth direction and arranged side by side, and
the first connecting portion corresponds to two first connecting arms which connect proximal ends of the two first lower arms and proximal ends of the two first upper arms, respectively, and are arranged side by side, and
in the engaging portion,
the second lower contact portion is constituted by two widthwise lower arms extending laterally outward from distal ends of the two first lower arms and two depthwise lower arms extending in a rear direction from distal ends of the two widthwise lower arms, respectively, and
the second upper contact portion is constituted by two depthwise upper arms extending in the rear direction and facing each other laterally and a widthwise upper arm which connects distal ends of the two depthwise upper arms and extends in a width direction, and
the second connecting portion is constituted by two second connecting arms which connect proximal ends of the two depthwise lower arms and proximal ends of the two depthwise upper arms, respectively, and face each other laterally.

12. The stator for a rotating electric machine according to claim 11, wherein the widthwise upper arm partially has a bend which is stretchable in the width direction.

13. The stator for a rotating electric machine according to claim 12, wherein
each of the two first upper arms has a bend following a shape of the upper surface of the temperature sensor on a side in the rear direction from the bend.

14. The stator for a rotating electric machine according to claim 11, wherein
each of the two depthwise upper arms partially has a stretchable bend.

15. The stator for a rotating electric machine according to claim 11, wherein
each of the two first upper arms partially has a bend.

16. The stator for a rotating electric machine according to claim 11, wherein
a part of each of the two widthwise lower arms has a mountain shape in a front plan view.

17. The stator for a rotating electric machine according to claim 11, wherein
a section modulus of an arm deformed in a direction other than the gripping direction is equivalent to a section modulus of an arm deformed in the gripping direction.

\* \* \* \* \*